(12) United States Patent
Sant et al.

(10) Patent No.: US 12,503,372 B2
(45) Date of Patent: Dec. 23, 2025

(54) FACILE, LOW-ENERGY ROUTES FOR THE PRODUCTION OF HYDRATED CALCIUM AND MAGNESIUM SALTS FROM ALKALINE INDUSTRIAL WASTES

(71) Applicant: The Regents of the University of California, Oakland, CA (US)

(72) Inventors: Gaurav N. Sant, Los Angeles, CA (US); Laurent G. Pilon, Los Angeles, CA (US); Erika Blanca Callagon La Plante, Los Angeles, CA (US); Bu Wang, Los Angeles, CA (US); Zongsu Wei, Los Angeles, CA (US); Sara Vallejo Castaño, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 47 days.

(21) Appl. No.: 18/100,283

(22) Filed: Jan. 23, 2023

(65) Prior Publication Data
US 2023/0159346 A1 May 25, 2023

Related U.S. Application Data

(62) Division of application No. 16/639,503, filed as application No. PCT/US2018/046981 on Aug. 17, 2018, now Pat. No. 11,560,318.
(Continued)

(51) Int. Cl.
*C01F 11/18* (2006.01)
*C01F 5/14* (2006.01)
(Continued)

(52) U.S. Cl.
CPC ............ *C01F 11/181* (2013.01); *C01F 5/145* (2013.01); *C01F 5/22* (2013.01); *C01F 5/24* (2013.01);
(Continued)

(58) Field of Classification Search
None
See application file for complete search history.

(56) References Cited

U.S. PATENT DOCUMENTS

| | | | |
|---|---|---|---|
| 3,525,606 | A | 8/1970 | Bodine |
| 4,566,800 | A | 1/1986 | Bodine |

(Continued)

FOREIGN PATENT DOCUMENTS

| | | | | |
|---|---|---|---|---|
| CA | 2780344 A1 | * | 5/2001 | ............... A23F 5/00 |
| CN | 101157464 A | | 4/2008 | |

(Continued)

OTHER PUBLICATIONS

Efendy et al., "Molten Metal-Slag-Refractory Reactions During Converting Process," International Journal of Engineering & Technology, 10: 1-5 (Jul. 2010).
(Continued)

*Primary Examiner* — Daniel Berns
(74) *Attorney, Agent, or Firm* — Foley Hoag LLP; David P. Halstead; Alexander J. Chatterley

(57) ABSTRACT

Divalent ions are extracted from solids by leaching to form a divalent ion-containing solution. The divalent ion-containing solution is subjected to concentration to form a concentrated divalent ion-containing solution. Precipitation of a divalent ion hydroxide salt is induced from the concentrated divalent ion-containing solution. In other cases, the concentrated divalent ion-containing solution is exposed to carbon dioxide to induce precipitation of a divalent ion carbonate salt.

15 Claims, 8 Drawing Sheets

Related U.S. Application Data

(60) Provisional application No. 62/679,498, filed on Jun. 1, 2018, provisional application No. 62/547,451, filed on Aug. 18, 2017.

(51) Int. Cl.

| | | |
|---|---|---|
| *C01F 5/22* | (2006.01) | |
| *C01F 5/24* | (2006.01) | |
| *C01F 11/00* | (2006.01) | |
| *C01F 11/16* | (2006.01) | |
| *C02F 1/44* | (2023.01) | |
| *C02F 1/469* | (2023.01) | |
| *C02F 1/52* | (2023.01) | |
| *C02F 9/00* | (2023.01) | |
| *C02F 1/66* | (2023.01) | |
| *C02F 103/06* | (2006.01) | |
| *C02F 103/08* | (2006.01) | |

(52) U.S. Cl.
CPC ............ *C01F 11/005* (2013.01); *C01F 11/16* (2013.01); *C01F 11/185* (2013.01); *C02F 1/441* (2013.01); *C02F 1/442* (2013.01); *C02F 1/4691* (2013.01); *C02F 1/5236* (2013.01); *C02F 9/00* (2013.01); *C02F 1/66* (2013.01); *C02F 2103/06* (2013.01); *C02F 2103/08* (2013.01); *Y02C 20/40* (2020.08); *Y02P 40/18* (2015.11)

(56) References Cited

U.S. PATENT DOCUMENTS

| | | | |
|---|---|---|---|
| 4,780,138 | A | 10/1988 | Bodine |
| 5,143,965 | A * | 9/1992 | Mertz .................. C01F 5/22 524/436 |
| 5,362,460 | A | 11/1994 | Laird et al. |
| 9,701,558 | B1 * | 7/2017 | Bader .................. C02F 9/00 |
| 10,087,536 | B2 | 10/2018 | Winther-Jensen et al. |
| 10,428,431 | B2 | 10/2019 | Swiegers et al. |
| 10,577,700 | B2 | 3/2020 | Winther-Jensen et al. |
| 11,560,318 | B2 | 1/2023 | Sant et al. |
| 2009/0001020 | A1 | 1/2009 | Constantz |
| 2011/0195017 | A1 | 8/2011 | Martinez Martinez |
| 2015/0307400 | A1 | 10/2015 | Devenney |
| 2016/0168732 | A1 | 6/2016 | Swiegers et al. |
| 2019/0256991 | A1 | 8/2019 | Swiegers et al. |
| 2020/0083541 | A1 | 3/2020 | Swiegers et al. |
| 2021/0024364 | A1 | 1/2021 | Sant et al. |
| 2022/0040639 | A1 | 2/2022 | Sant et al. |
| 2023/0074483 | A1 | 3/2023 | Jassby et al. |
| 2024/0424451 | A1 | 12/2024 | Jassby et al. |
| 2025/0154624 | A1 | 5/2025 | Sant et al. |

FOREIGN PATENT DOCUMENTS

| | | | |
|---|---|---|---|
| EP | 2444507 | B1 | 3/2015 |
| EP | 3903951 | A1 | 11/2021 |
| JP | 2003220307 | A * | 8/2003 ............ B01D 29/01 |
| JP | 2012-234732 | A | 11/2012 |
| JP | 2020-132951 | A | 8/2020 |
| WO | WO-2009/127018 | A1 | 10/2009 |
| WO | WO-2018/081310 | A1 | 5/2018 |
| WO | WO-2019/036676 | A1 | 2/2019 |
| WO | WO-2022/020470 | A8 | 4/2022 |
| WO | WO-2023/047075 | A1 | 3/2023 |
| WO | WO-2023/081448 | A1 | 5/2023 |
| WO | WO-2023/091087 | A2 | 5/2023 |
| WO | WO-2023/159041 | A1 | 8/2023 |
| WO | WO-2023/230474 | A1 | 11/2023 |
| WO | WO-2023/244779 | A1 | 12/2023 |

OTHER PUBLICATIONS

International Preliminary Report on Patentability issued in PCT Application No. PCT/US2018/046981 Dtd Feb. 27, 2020, 10 pages.
International Search Report and Written Opinion, issued in International Application No. PCT/US2018/046981, 13 pages (Oct. 30, 2018).
Intaranont et al., "Selective lithium extraction from brines by chemical reaction with battery materials," Journal of Materials Chemistry 2.18 (2014): 6374-6377.
International Search Report and Written Opinion for International Application No. PCT/US22/49102 dated Feb. 12, 2023.
International Search Report and Written Opinion for International Application No. PCT/US23/25526 dated Sep. 28, 2023.
International Search Report and Written Opinion for International Application No. PCT/US23/62624 dated May 30, 2023.
International Search Report and Written Opinion for International Application No. PCT/US23/67355 dated Sep. 3, 2023.
International Search Report and Written Opinion for International Application No. PCT/US24/22727 dated Jul. 28, 2024.
Kumar et al., "Direct electrosynthesis of sodium hydroxide and hydrochloric acid from brine streams," Nature Catalysis, (2019), 2.2: 106-113.
Nivetha et al., "Recovery of nickel from spent NiCd batteries by regular and ultrasonic leaching followed by electrodeposition." Journal of Electrochemical Science and Engineering , vol. 10, No. 1, pp. 41-47 (2020).
Sun et al., "Highly selective, regenerated ion-sieve microfiltration porous membrane for targeted separation of Li+." Journal of Porous Materials, 2016, 23: 1411-1419.
Umeno et al. "Preparation and adsorptive properties of membrane-type adsorbents for lithium recovery from seawater." Industrial & engineering chemistry research, 2002, 41.17: 4281-4287.
Xu et al., "Extraction of lithium with functionalized lithium ion-sieves." Progress in Materials Science, 2016, 84: 276-313.
Zhu et al., "Adsorption and desorption properties of $Li_+$ on PVC-H1. 6Mn1. 6O4 lithium ion-sieve membrane." Chemical Engineering Journal, 2014, 235: 340-348.
Justnes et al., "Transformation Kinetics of Burnt Lime in Freshwater and Sea Water," Materials 13 (2020): 4926.

\* cited by examiner

US 12,503,372 B2

FACILE, LOW-ENERGY ROUTES FOR THE PRODUCTION OF HYDRATED CALCIUM AND MAGNESIUM SALTS FROM ALKALINE INDUSTRIAL WASTES

CROSS-REFERENCE TO RELATED APPLICATIONS

This application is a divisional of U.S. application Ser. No. 16/639,503, filed Feb. 14, 2020, which is the § 371 National Stage of PCT/US2018/046981, filed Aug. 17, 2018, which claims the benefit of U.S. Provisional Application No. 62/547,451, filed Aug. 18, 2017, and the benefit of U.S. Provisional Application No. 62/679,498, filed Jun. 1, 2018, the contents of each of which are incorporated herein by reference in their entirety.

STATEMENT REGARDING FEDERALLY SPONSORED RESEARCH OR DEVELOPMENT

This invention was made with Government support under DE-FE0029825, awarded by the U.S. Department of Energy, and 1253269, awarded by the National Science Foundation. The Government has certain rights in the invention.

TECHNICAL FIELD

This disclosure generally relates to the production of portlandite and brucite and the production of carbonate solids.

BACKGROUND

The commercial production of portlandite ($Ca(OH)_2$) and brucite ($Mg(OH)_2$) presently involves calcination-based methods, which require a significant amount of thermal energy. To produce portlandite, calcite ($CaCO_3$) is heated to about 800° C. to produce lime (CaO) and carbon dioxide ($CO_2$). The lime produced is then reacted with water to form $Ca(OH)_2$ by a slaking process. Commercial $Mg(OH)_2$ is produced by adding portlandite to seawater rich in $Mg^{2+}$, thereby precipitating $Mg(OH)_2$. Alternatively, hydrated magnesium chloride ($MgCl_2$) from seawater is recrystallized several times, and then calcined at about 1000° C., before reacting with water to form a hydroxide slurry.

Also, brines from various industrial processes, such as desalination operations and oil and gas production, are hypersaline streams typically treated as waste. However, such brines are actually a potential sink for $CO_2$ as they are rich in divalent ions such as $Ca^{2+}$ and $Mg^{2+}$ which react with aqueous $CO_3^{2-}$ from the dissolution of $CO_2$ in water to form relatively insoluble carbonate solids. Carbonate precipitates formed in this manner can have a wide range of industrial applications. An example of a brine waste stream is produced water, which refers to the water generated during oil and gas production, and which can have divalent ion concentrations of up to about 100,000 parts per million (ppm). Such process can provide an effective route to mitigate the increasing anthropogenic $CO_2$ emissions at a gigaton-scale, since brines are generated at large quantities annually around the world (e.g., about 22 billion barrels of produced water was generated in 2014 in the United States alone). However, effective extraction of divalent ions from hypersaline and complex aqueous matrices in brines as carbonate solids at low cost and energy expense remains a significant challenge.

It is against this background that a need arose to develop the embodiments described herein.

SUMMARY

In some embodiments, a method includes: (1) extracting divalent ions from solids by leaching to faun a divalent ion-containing solution; (2) subjecting the divalent ion-containing solution to concentration to form a concentrated divalent ion-containing solution; and (3) inducing precipitation of a divalent ion hydroxide salt from the concentrated divalent ion-containing solution.

In some embodiments, a method includes: (1) producing a concentrated divalent ion-containing solution from a feed solution; and (2) introducing carbon dioxide to the concentrated divalent ion-containing solution to induce precipitation of a carbonate salt.

In some embodiments, a system includes: (1) a divalent ion enrichment unit to produce a concentrated divalent ion-containing solution from a feed solution; and (2) a carbonation reactor connected to the divalent ion enrichment unit to receive the concentrated divalent ion-containing solution and introduce carbon dioxide to the concentrated divalent ion-containing solution to induce precipitation of a carbonate salt.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1:
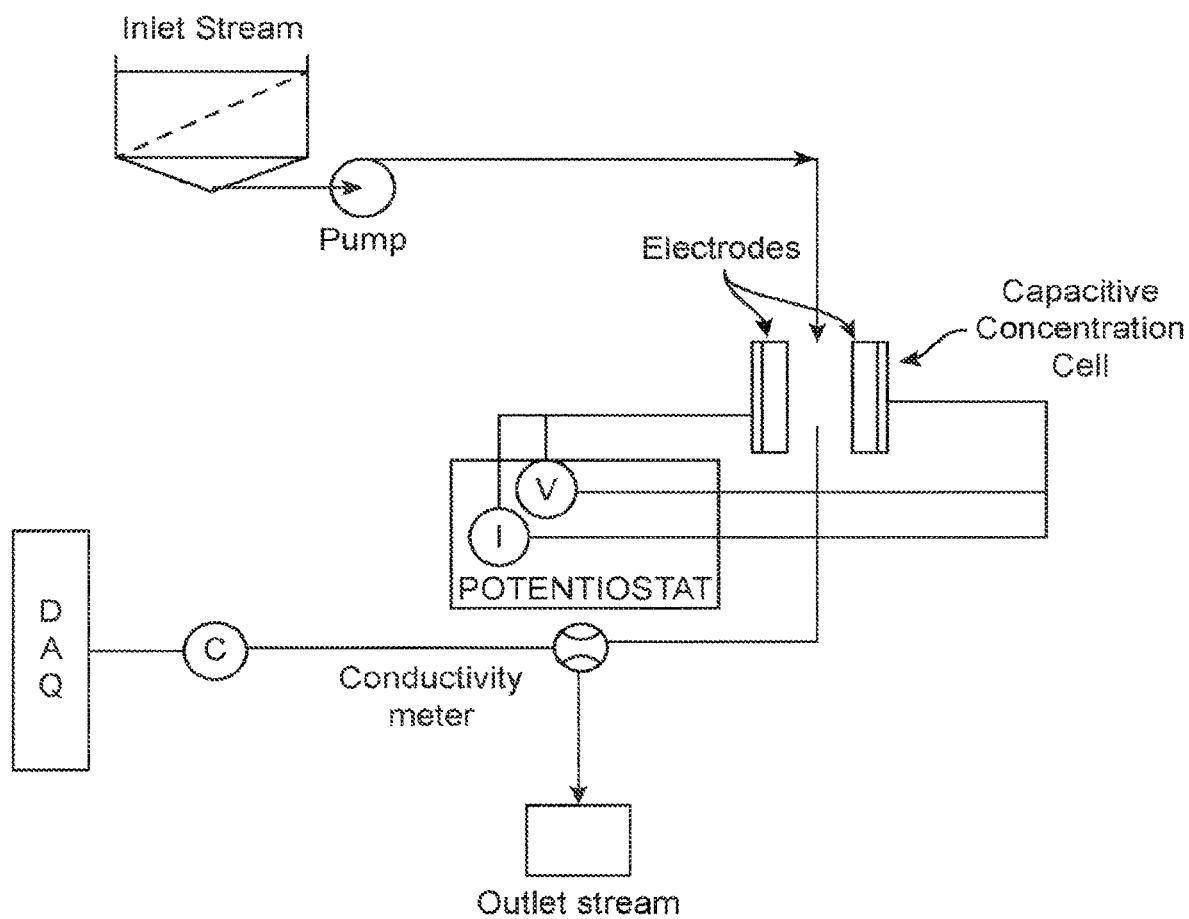
FIG. 1. A schematic of a capacitive concentration process.

Production of Hydrated Calcium and Magnesium Salts from Alkaline Industrial Wastes Some embodiments of this disclosure are directed to a thermally and $CO_2$ efficient route for the production of hydrated divalent ion salts, including the production of hydroxide salts of calcium and magnesium, namely portlandite ($Ca(OH)_2$) and brucite ($Mg(OH)_2$). In some embodiments, the method can be performed at ambient to moderately elevated temperatures at or below about 100° C. In some embodiments, the method utilizes industrial wastes or by-products, such as those derived from metal processing and fuel combustion, and other sources that are generally enriched in calcium (Ca) and magnesium (Mg), and that provide a route for the production of hydrated calcium and magnesium salts without calcination.

In some embodiments, a method for $Ca(OH)_2$ and $Mg(OH)_2$ production involves the following operations: (1) extraction of calcium and magnesium divalent ions (cations in the form of $Ca^{2+}$ and $Mg^{2+}$) from a source of Ca and Mg, such as crystalline or amorphous alkaline solids (e.g., included in industrial wastes or by-products, among others) by leaching to form a Ca- and Mg-containing leachate; (2) concentration of the Ca- and Mg-containing leachate by capacitive concentration (CC) or membrane filtration to form a $Ca(OH)_2$— and $Mg(OH)_2$-saturated solution, and (3) direct precipitation of $Ca(OH)_2$ and $Mg(OH)_2$ from the solution by exploiting the temperature-dependent solubility of these salts.

In operation (1) according to some embodiments, $Ca^{2+}$ and $Mg^{2+}$ are extracted from industrial wastes or by-products, such as those derived from metal processing and fuel combustion (e.g., coal fly ashes), among other sources that are generally enriched in Ca and Mg. In some embodiments, $Ca^{2+}$ and $Mg^{2+}$ are extracted from slags, fly ashes, or other alkaline solids by dissolution in, or exposure to, water or other aqueous leaching solution at ambient or moderately elevated temperature, and at ambient pressure, in the presence or not, of specific leaching aids. Slags, which are by-products derived from metal production, include slags derived from iron production (e.g., air-cooled blast furnace (BF) slag) and steel production (e.g., electric arc furnace (EAF) slag and basic oxygen furnace (BOF) slag), and are typically composed of Ca- and Mg-containing silicates. Although glassy slags find use as replacement material for ordinary Portland cement (OPC), crystalline slags presently find limited use as low-value aggregates. Such crystalline slags are abundant and include significant amounts of Ca and Mg. Fly ash, including that sourced from historical reservoirs (e.g., landfills and ash ponds), is a coal combustion by-product which also includes high concentrations of Ca. In order to increase a leaching rate, one or more metal leaching agents (e.g., acetate, ethylenediaminetetraacetic acid (EDTA), and so forth) and/or one or more acids (e.g., acetic acid, hydrochloric acid, and so forth) can be added to a leaching solution. A slag can also be ground or pulverized to finer particle sizes to increase the rate of light metal extraction.

Next, in operation (2) according to some embodiments, concentrations of Ca and Mg in a leachate are enhanced using CC, leveraging an increased selectivity of CC to divalent ions. In some embodiments, a CC cell includes a capacitor arrangement having the following features: a small thickness, a high specific surface area, a high porosity, and a bimodal pore size distribution between mesopores and micropores in its structure. In some embodiments, a material of an electrode in the capacitor arrangement is an inert carbon-based or carbonaceous solid, which acts as a current collector, and is resistant to corrosion. A CC cell operated at a relatively low electrical input can be more energy efficient than certain membrane processes driven by high-pressure pumps.

Figures 2A, 2B:
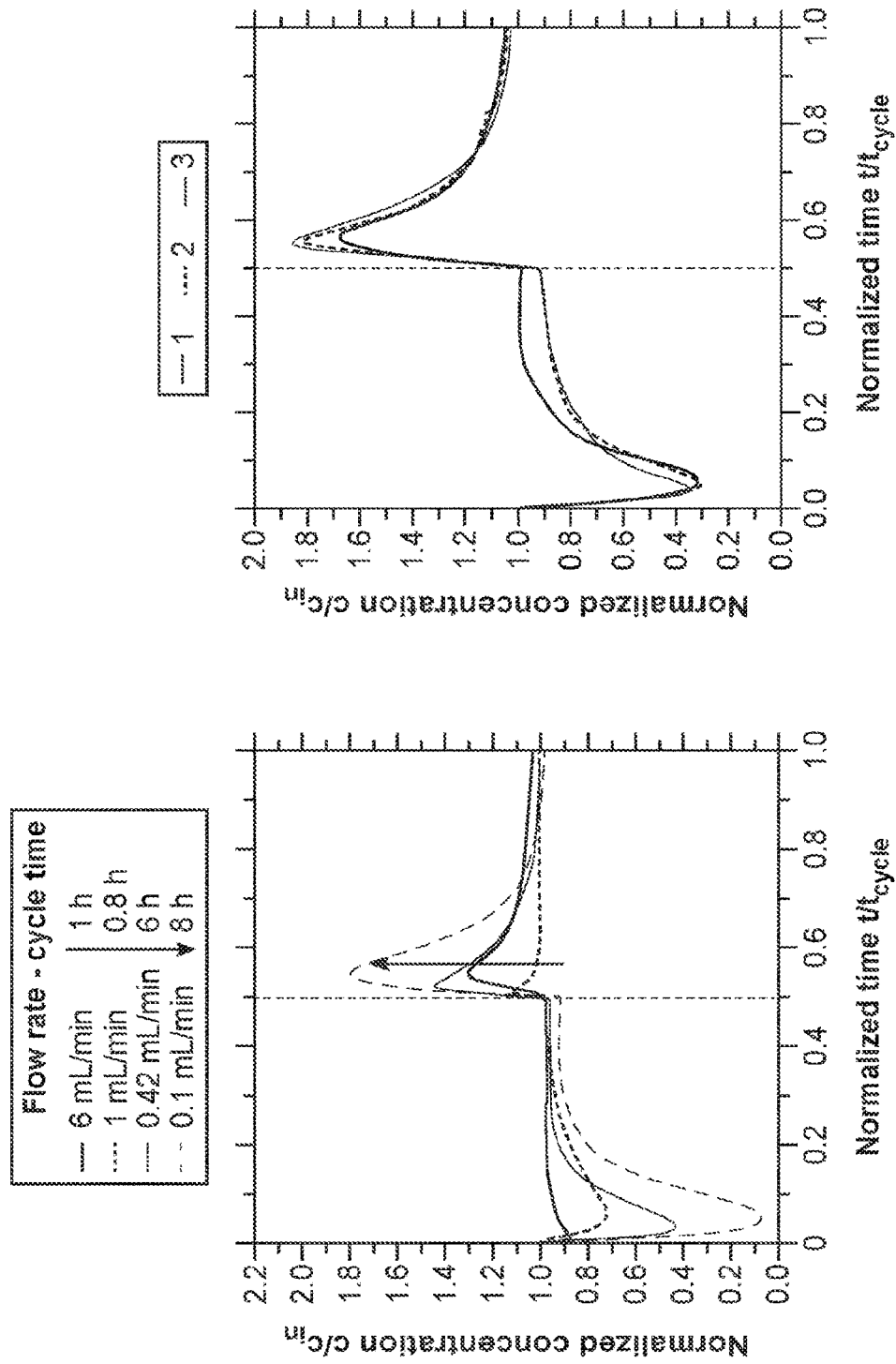
FIG. 2. (a) Effect of flow rate and cycle time on ion concentration for the following operation parameters: about 1 V and 0 V for charging and discharging respectively, inlet concentration of about 10 mM $CaCl_2$ and carbon electrodes. Flow rates and cycle times are specified in the legend. (b) Evolution of normalized concentration over time measured for 3 potential cycling sequences (about 1 V and 0 V) for an about 10 mM $CaCl_2$ inlet solution, a flow rate of about 0.1 mL/min and a cycle time of about 6 h.

A schematic of a CC process is shown in FIG. 1. As shown, an inlet stream is conveyed through a CC cell (as a divalent ion enrichment unit) using a pump (e.g., a peristaltic pump), and the CC cell includes a pair of electrodes. Concentration enhancement of metals in a solution is carried out by applying an electrical input on the pair of electrodes in the form of voltage or electric current, where the electrical input is applied via an electrical source connected to the electrodes. Consequently, metal ions present in the solution migrate to surfaces of the electrodes, forming an electric double layer (EDL) structure. Generally, an electrically charged surface that is in contact with an electrolyte solution attracts ions in the solution of an opposite charge. Hence, positive and negative ions migrate and are absorbed at the negatively and positively charged electrode, respectively, producing a relatively ion-depleted stream of the solution. When the concentration of ions in an outlet stream reaches a threshold/pre-determined value, the current or voltage is reversed or is reduced to zero, releasing the ions adsorbed at the surfaces of the electrodes back into the solution. Thus, a solution enriched with ions (relative to an original inlet solution) is obtained. For example, for calcium chloride solutions, an ion concentration in an outlet solution is about 20% to about 80% higher than in an inlet solution in terms of normalized concentration (e.g., a ratio between the outlet and inlet concentrations) depending on flow rate and cycle time, as shown in FIG. 2a. In general, longer cycle times and lower flow rates can enhance the concentration factor. Further, cyclic CC demonstrates the repeatability of the concentration process (e.g., adsorption-desorption of ions), as shown in FIG. 2b.

Referring back to FIG. 1, the pair of electrodes of the CC cell are connected to a potentiostat, which is used to apply voltage cycles and obtain a measurement of a current response in the cell, while solution conductivity is measured for an outlet stream using a conductivity meter to determine the extent of concentration. A data acquisition (DAQ) system is connected to various components to direct operation of the CC process.

Figure 3:
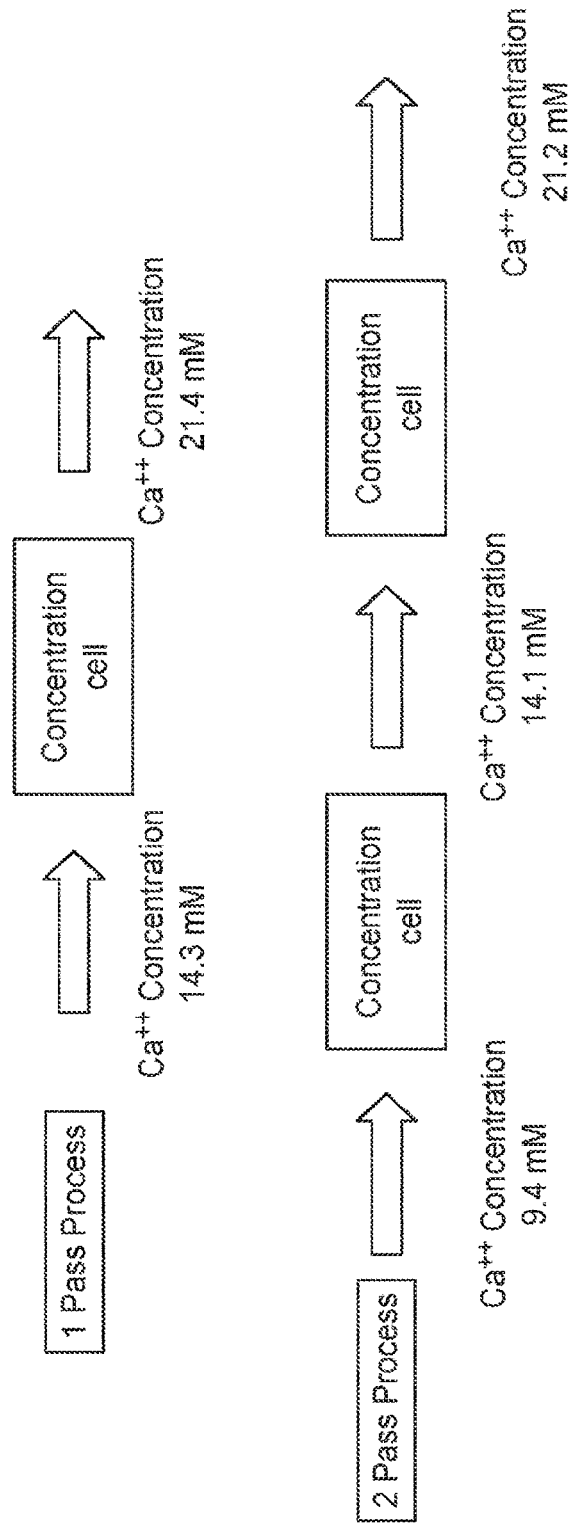
FIG. 3. Examples of 1- and 2-pass processes of capacitive concentration resulting in a $Ca(OH)_2$-saturated solution, optimized based on Ca concentration in an inlet solution.

Depending on an initial leachate concentration, a series of connected CC cells can be included in a CC system to achieve a desired concentration for $Ca(OH)_2$ and $Mg(OH)_2$ saturation at about 25° C., which are calculated to be about 21 mM and about 0.13 mM in pure water, respectively. Therefore, according to these assumptions, the number of passes through one or more CC cells can be optimized as a function of the concentration of Ca (or Mg) in an inlet solution (FIG. 3). In general, the number of passes can be n, where n is an integer that is 1 or more, such as 2 or more, 3 or more, and so forth. It is also contemplated that multiple passes can be performed by recirculating an outlet stream from a CC cell as an inlet stream for the same CC cell, for concentration enhancement.

Unlike capacitive deionization (CDI) systems which are typically used to decrease ion concentration in solutions in desalination systems, performing the CC operation in the method of some embodiments is specifically designed to increase a concentration of ions in an outlet stream, thereby converting a dilute stream of Ca and Mg ions into one that is more concentrated, such as one that is at or near saturation with respect to $Ca(OH)_2$ and $Mg(OH)_2$. Particularly, since the CC system is operated at or near ambient temperature and pressure, performing the CC operation features low energy consumption, in contrast to other approaches such as concentration by solvent evaporation, which involves high temperature.

Further, the divalent Ca and Mg ions can be selectively concentrated using CC, by leveraging a transient ion selectivity that arises when an EDL at a surface of an electrode reaches equilibrium with an applied electrical input. As the input is applied, ions that are most abundant in the input will initially migrate to an electrode. However, at later times, the adsorbed ions will be replaced by those of a higher valence.

Another option for enhancing concentrations of Ca and Mg in a leachate is using membrane filtration. Membrane filtration is a separation process carried out by pressurizing a solution including ions and other impurities through a semipermeable membrane, such as a nanofiltration membrane or a reverse osmosis membrane, which can be functionalized. A less concentrated stream (namely, a permeate) passes through the semipermeable membrane, while dissolved salts and other impurities are retained in a concentrated stream (namely, a retentate). The rejection of ions is due to one or more of size exclusion, charge exclusion, and physical-chemical ion interaction effects between the solution and the semipermeable membrane. The pressure to drive the membrane filtration process depends on the concentration of ions in an inlet stream.

Figure 4:
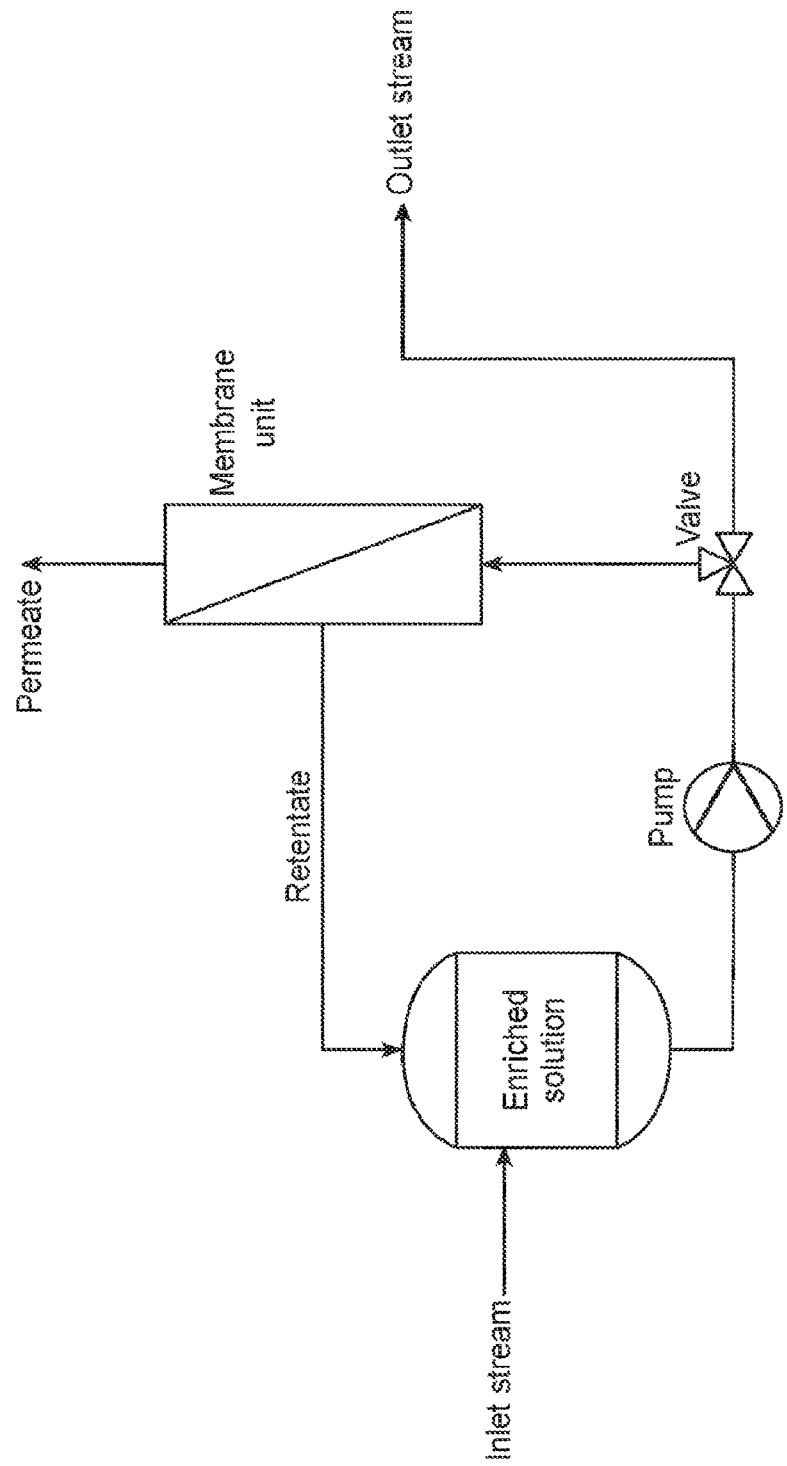
FIG. 4. A schematic of a membrane filtration process.
Figures 5A, 5B:
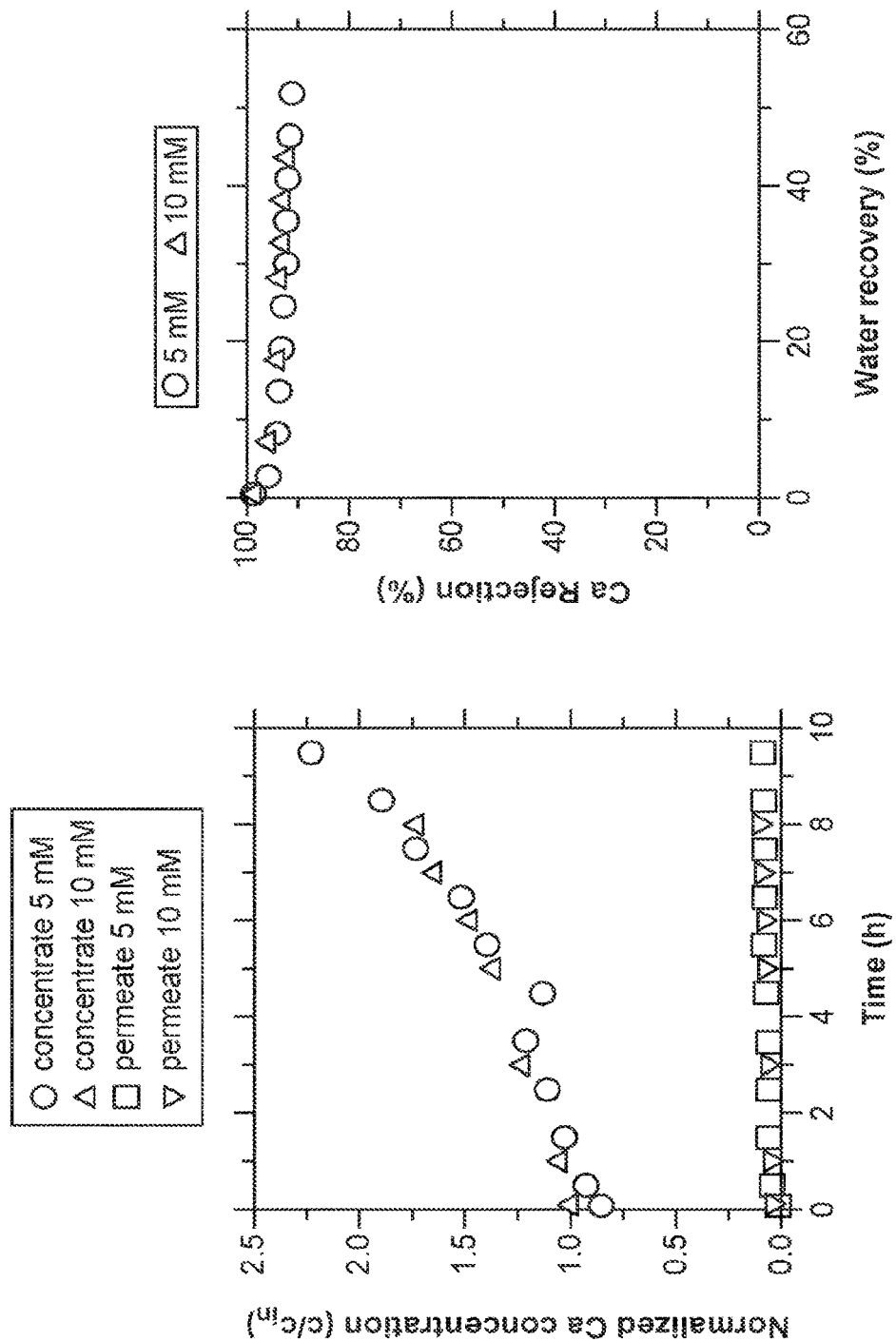
FIG. 5. Results of reverse osmosis experiments with about 5 mM and about 10 mM $Ca(OH)_2$ solutions showing (a) normalized calcium concentration as a function of time for concentrate and permeate streams and (b) Ca rejection as a function of water recovery.

A schematic of a membrane filtration process is shown in FIG. 4. As shown, an inlet stream is conveyed into a feed tank, and a feed solution is then conveyed from the feed tank through a membrane separation unit (as a divalent ion enrichment unit) by operation of a pump and a valve in a cross-flow mode: a retentate is conveyed back to the feed tank while a permeate passes through a membrane in the membrane separation unit. The feed solution is continuously concentrated as the divalent ions (e.g., $Ca^{2+}$ and $Mg^{2+}$) are retained and accumulate in an outlet stream. Using calcium hydroxide solutions, Ca concentration factors (in terms of a ratio between the outlet and inlet concentrations) greater than about 2 can be obtained using reverse osmosis membrane filtration, corresponding to Ca rejection greater than about 90% (FIG. 5).

Figures 6A, 6B:
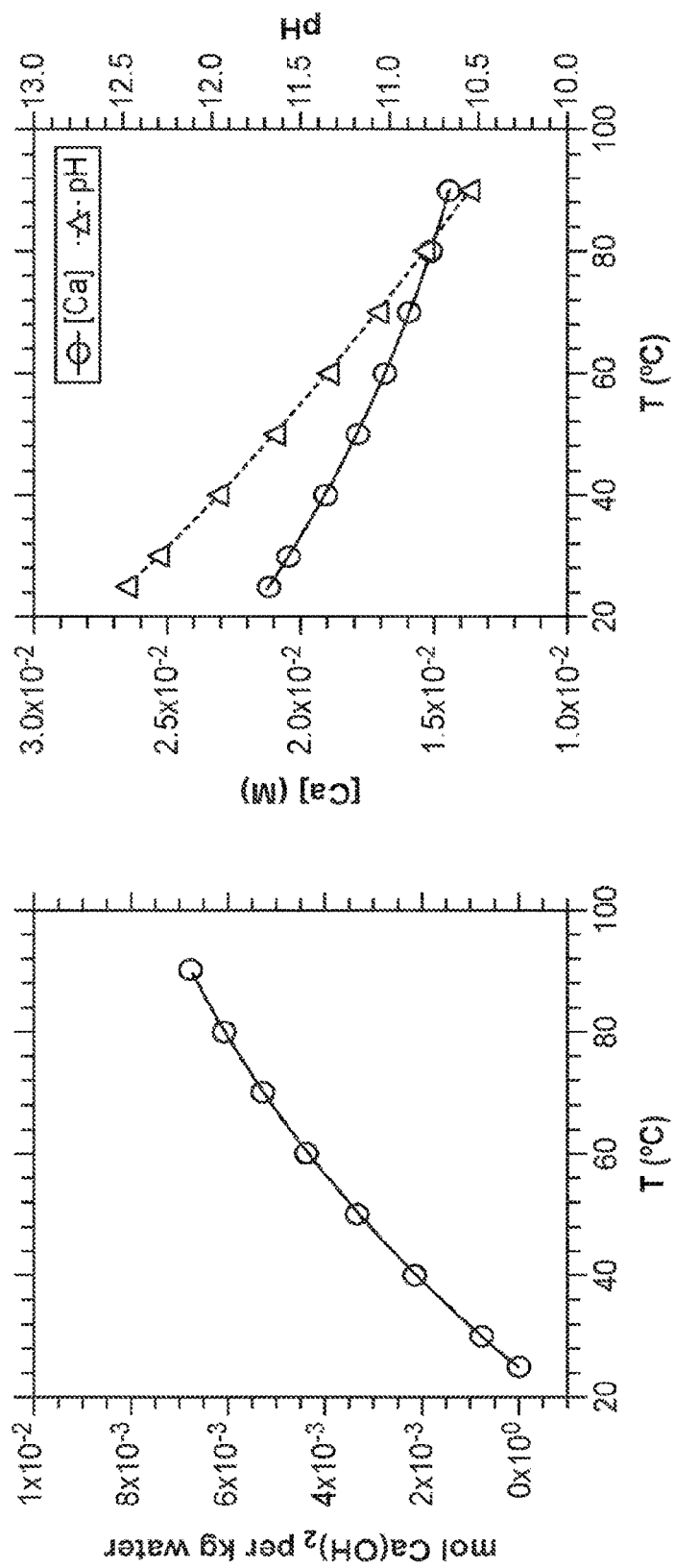
FIG. 6. Thermodynamic calculations on portlandite precipitation. In this simulation carried out in PHREEQC using the minteq.v4 database, the temperature of a solution that is initially at saturation with respect to $Ca(OH)_2$ at 25° C. was increased incrementally to 90° C. Because of the retrograde solubility of portlandite, namely solubility decreases with increasing temperature, supersaturation of the initial solution is achieved. (a) Moles of $Ca(OH)_2$ precipitated per kg of an initially $Ca(OH)_2$-saturated solution at 25° C. As the temperature is increased, the solution becomes increasingly supersaturated in portlandite, resulting in an increasing extent of precipitation of the solid. (b) [Ca] and pH of the same solution as in (a) decrease with increasing temperature as portlandite precipitates.

Next, in operation (3) according to some embodiments, subsequent precipitation of $Ca(OH)_2$ and $Mg(OH)_2$ involves a temperature swing process. An outlet solution from the CC operation can be conveyed to a reactor, and can be heated (e.g., to a temperature above ambient temperature or above about 25° C. and at or below about 100° C., such as up to about 95° C., up to about 90° C., up to about 80° C., up to about 70° C., or up to about 60° C.) using, for example, waste heat from a power plant or other thermal source. Because the solubilities of $Ca(OH)_2$ and $Mg(OH)_2$ decrease with increasing temperature, such a temperature increase results in the supersaturation of the solution with respect to these salts, and eventual precipitation of these salts from the solution. It is noted that if leaching is performed at an elevated temperature, a leachant is first cooled to at or near about 25° C. prior to the CC operation to allow for higher aqueous Ca and Mg concentrations. Equilibrium calculations show that up to about 7 mmol (about 0.52 g) of portlandite can be precipitated with the method from about 1 kg of water that was at saturation with $Ca(OH)_2$ at about 25° C. (FIG. 6).

Selectively Enriching Divalent Ions from Brines for $CO_2$ Mineralization

Effective extraction of divalent ions from hypersaline and complex aqueous matrices in brines as carbonate solids at low cost and energy expense remains a significant challenge. This process of $CO_2$ mineralization can be significantly improved by utilizing precursors containing divalent ions at relatively high concentrations. Methods that can selectively enrich divalent ions such as $Ca^{2+}$ and $Mg^{2+}$ for subsequent $CO_2$ mineralization are therefore particularly desired to facilitate carbonate formation while deriving valuable products.

Some embodiments of this disclosure are directed to enhancing the efficiency of $CO_2$ mineralization processes that utilize industrial and natural brines, including produced water from hydraulic fracking, brine concentrate from desalination plants, industrial wastewater, and sea water. This is achieved by implementing a brine pre-treatment stage to selectively enrich divalent ions (e.g., $Ca^{2+}$ and $Mg^{2+}$), thereby substantially increasing the carbonation capacity of brine waste streams while reducing operational costs.

During $CO_2$ mineralization using brines, carbonate solids precipitate from a solution in the form of polymorphs of calcium carbonate, magnesium carbonate, and related compounds. Precipitation reactions can be described as the reduction of soluble ions from the solution through the formation of an insoluble product. Yet, precipitation of these carbonates from brines may not be favored because of the high background salinity, arising from the abundance of alkali metals and halides (e.g., $Na^+$, $K^+$, $Cl^-$, and so forth), which typically occurs at a much higher concentration than that of $Ca^{2+}$ and $Mg^{2+}$. Comparable pathways for direct carbonation using brines involve substantial consumption of energy (e.g., electrolysis or temperature swing) or use of expensive chemical reagents (e.g., HCl or NaOH for pH adjustment), rendering such processes economically unfeasible.

Towards this end, some embodiments incorporate a pre-treatment stage in a $CO_2$ mineralization process to selectively enrich divalent ions in brines. To reduce operational costs, economically practicable enrichment options, namely membrane filtration (e.g., nanofiltration or reverse osmosis), and/or capacitive concentration (CC), may be selected. These concentration processes can accommodate natural or industrial brines having various pHs and containing various aqueous species of a wide range of concentrations. In addition, each of these processes can be optimized for operation under a wide range of processing conditions including flow rate, cycle time, and so forth.

Membrane filtration is a rapid enrichment process characterized by excellent selectivity towards divalent ions such as $Ca^{2+}$ and $Mg^{2+}$ (or other multivalent ions) over monovalent ions such as $Na^+$ and $K^+$, afforded by proper selection of the membrane pore size. For example, a membrane having a pore size of about 0.5 nm to about 10 nm can retain divalent ions (e.g., $Ca^{2+}$ and $Mg^{2+}$) in a retentate while allowing the passage of smaller monovalent ions (e.g., $Na^+$ and $K^+$) in a permeate when a filtration (e.g., nanofiltration) unit is operated in a cross-flow mode. Therefore, the divalent ions accumulate in the retentate ultimately reaching high concentrations. The retention percentage can be up to about 99% (or more) for $Ca^{2+}$ and $Mg^{2+}$, yet there can be also a high rejection rate of greater than about 50% for $Na^+$ and $K^+$. In some implementations, the membrane can have a pore size that allows about 40% to about 50% permeation for divalent ions (e.g., $Ca^{2+}$ and $Mg^{2+}$), but close to 0% retention for monovalent ions (e.g., $Na^+$ and $K^+$), such as about 10% retention or less, about 5% retention or less, or about 1% retention or less. For example, the pore size can be about 1 nm or greater, about 3 nm or greater, or about 5 nm or greater, and up to about 10 nm or greater. The reduced NaCl level in the retentate can further facilitate $CO_2$ mineralization since high NaCl concentrations can inhibit carbonate precipitation.

CC is another option for selective enrichment of divalent ions. Electrodes of a CC cell can exhibit higher selectivity to divalent ions (e.g., $Ca^{2+}$ and $Mg^{2+}$) over monovalent ions (e.g., $Na^+$ and $K^+$), because of their higher charges. Under optimized conditions (e.g., in terms of electrode configuration, electrical input, and flow rate), up to about 90% (or more) of divalent ions can be separated from a solution.

Following pre-treatment of a brine by either membrane filtration or CC, carbonation of a concentrated solution including divalent ions can proceed with a significantly enhanced efficiency.

Figure 7A:
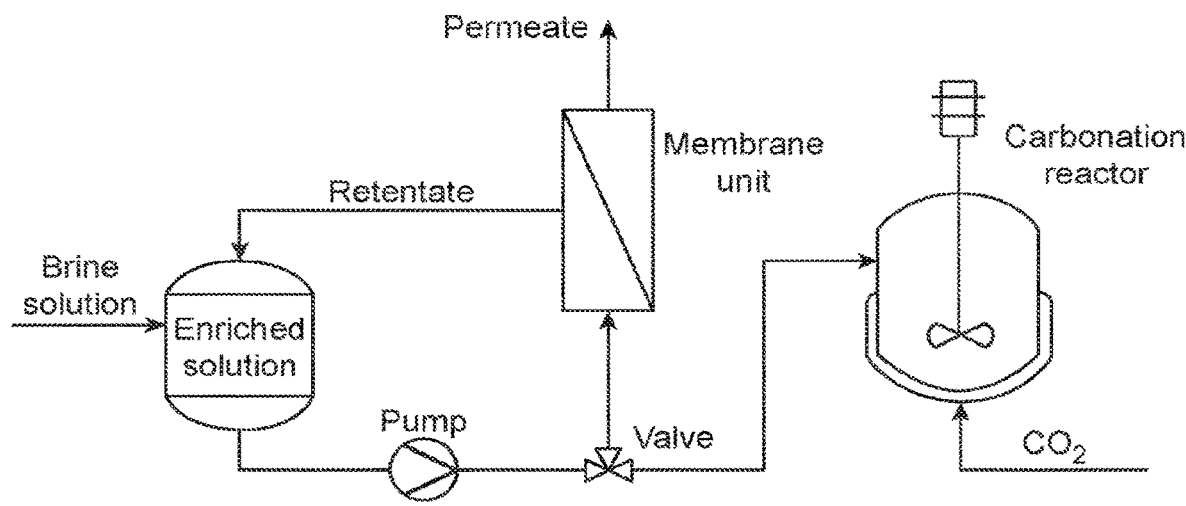
FIG. 7. Process schematic of brine solution enrichment and subsequent carbonation of enriched solutions using (a) membrane filtration and (b) capacitive concentration.
Figure 7B:
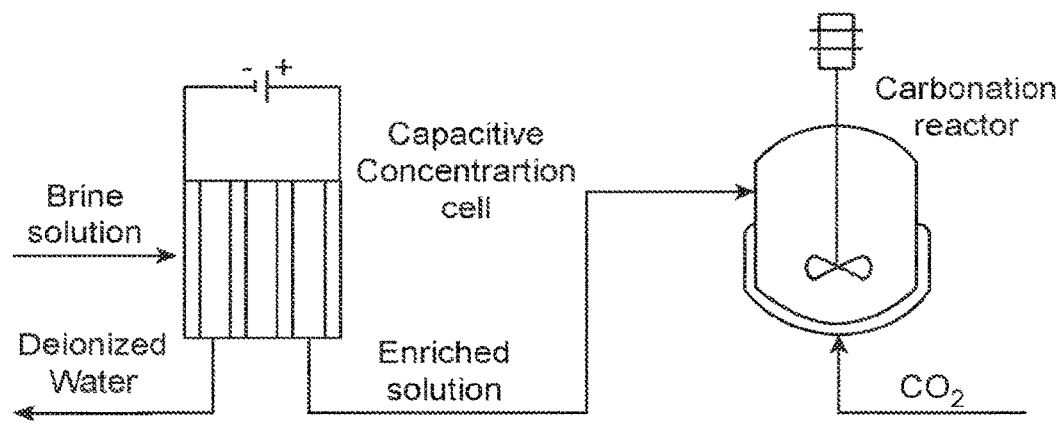

FIG. 7 shows a schematic of a pre-treatment and carbonation system in which first, divalent ions (e.g., $Ca^{2+}$ and $Mg^{2+}$) are enriched from brine solutions using either cross-flow membrane separation or CC. This is followed by the subsequent carbonation of enriched solutions. As shown in FIG. 7a, a feed brine solution from a feed tank is conveyed through a membrane separation unit (as a divalent ion enrichment unit) by operation of a pump and a valve in a cross-flow mode: a retentate is conveyed back to the feed tank while a permeate passes through a membrane. The feed brine solution is continuously concentrated as the divalent ions (e.g., $Ca^{2+}$ and $Mg^{2+}$) are retained and accumulate and monovalent ions (e.g., $Na^+$, $K^+$, and $Cl^-$) in a permeate pass through the membrane. The permeate can be further desalinated by reverse osmosis for water purification. The concentrated brine solution features substantially reduced volumes (e.g., about 1% to about 10% of the feed solution) and substantially higher concentrations of the divalent ions (e.g., about 1.2 times or greater than a concentration of the divalent ions in the feed solution, such as about 1.4 times or greater, about 1.5 times or greater, about 2 times or greater, about 2.5 times or greater, about 5 times or greater, about 10 times or greater, about 20 times or greater, about 50 times or greater, and up to about 100 times or greater) is then conveyed to a carbonation reactor (e.g., a stirred-tank reactor) for $CO_2$ mineralization. FIG. 7b presents a CC-based enrichment process. As shown, a CC cell (as the divalent ion enrichment unit) can include multiple electrodes connected to an electrical source to apply an electrical input across the electrodes. The divalent ions collected in the electrodes are subsequently released and then flushed directly into the carbonation reactor including a small volume of fresh water. A concentrated brine solution will have a substantially higher concentration of divalent ions (e.g., about 1.2 times or greater than a concentration of the divalent ions in a feed solution, such as about 1.4 times or greater, about 1.5 times or greater, about 2 times or greater, about 2.5 times or greater, about 5 times or greater, about 10 times or greater, about 20 times or greater, about 50 times or greater, and up to about 100 times or greater) than the initial brine feed.

Figure 8:
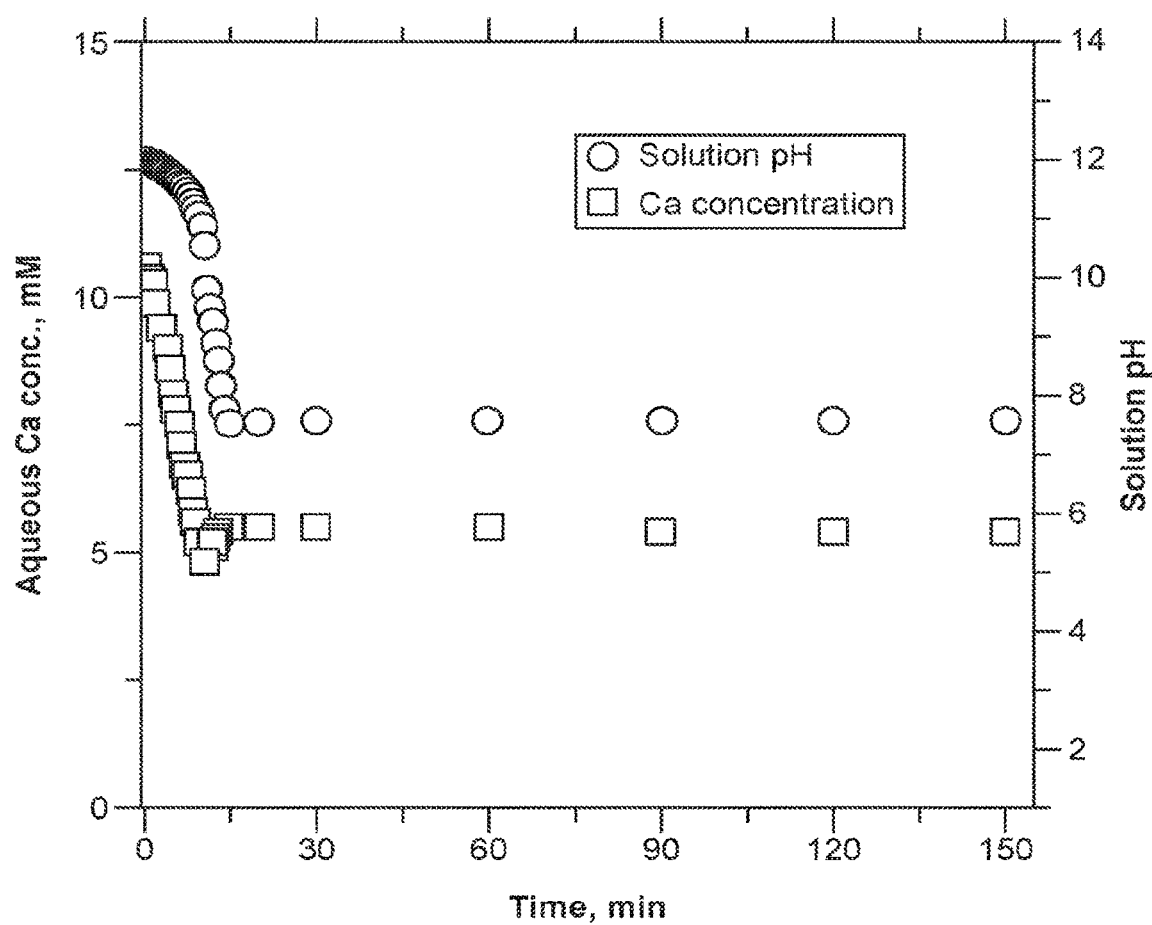
FIG. 8. Carbonation of calcium-containing brine solution and corresponding pH change. Conditions are as follows: Initial solution volume=about 1.0 L, $[CaCl_2]_{initial}$=about 12.5 mM, [NaCl]=about 1.0 M, $CO_2$ injection flow rate=about 1.00 mL min$^{-1}$, pH=about 12 adjusted by NaOH, temperature=about 20° C., and pressure=about 1.0 atm.

Following the pre-treatment of the brine, carbonation can be conducted in a stirred-tank reactor by injecting or introducing $CO_2$-containing gas (e.g., a flue gas) into the concentrated solution. Note that solution pH usually decreases to below about 6 after $CO_2$ dissolution, which can inhibit carbonate precipitation. Favorable conditions (e.g., a pH of about 7 or greater, about 7.5 or greater, or about 8 or greater) can be obtained by adjusting the pH via a pH swing process (e.g., using an alkaline reagent in the form of alkaline waste, reusable alkaline buffer, or resin with ionic exchange groups) so that $Ca^{2+}$ and $Mg^{2+}$ can continue to react with $CO_2$ to form carbonate precipitates. For example, the solution pH can first be elevated to about 11 to about 12 by adding an alkaline reagent (e.g., a leachate derived from alkaline wastes) to allow for a sufficient amount of $CO_2$ to react with the concentrated brine solution. As shown in FIG. 8, nearly about 50% of $Ca^{2+}$ in the level of about 10 mM to about 20 mM can be precipitated as carbonate salts at or near ambient conditions as carbonation proceeds, while solution pH is allowed to decrease from about 12 to about 7.5. A series of buffering and carbonation processes can be included so as to precipitate $Ca^{2+}$ and $Mg^{2+}$ at a higher extent (e.g., >about 90%). When co-located with a thermal power plant, waste heat from the power plant can be utilized to increase temperature and/or pressure of a gas feed to enhance the extent and the kinetics of the carbonation reaction. The accumulated carbonate salts in the stirred-tank reactor can be thereafter separated from a liquid using a solid-liquid separation method, such as filtration.

Some embodiments of this disclosure establish an integrated process for divalent ion enrichment and subsequent carbonation using industrial and/or natural brine solutions as feed. The enrichment process allows efficient extraction of divalent ions from brine streams for $CO_2$ mineralization, providing a desirable pathway to reduce the operational cost and improve the commercial viability of brine mineralization processes. The enrichment process can be implemented in industrial $CO_2$ capture and carbonate production methods that utilize brines as a feed material, such as carbonate production from desalination brines. It can also be used in brine-based $CO_2$ capture processes, such as $CO_2$ mineralization of produced water from oil and gas extraction operations.

Compared with other $CO_2$ sequestration technologies, the brine mineralization process of some embodiments features the following advantages:
1) It provides a method for simultaneously treating three waste streams: $CO_2$, brine waste stream, and/or industrial alkaline waste.
2) The carbon storage capacity is greater as large amounts of brines are available, contrary to the finite availability of solid alkaline materials such as lime, slag and fly ash.
3) The process features a lower energy burden as energy-intensive material processing can be omitted, unlike processes utilizing solid minerals like serpentine or olivine that are crushed, milled, and then heat-treated prior to carbonation.
4) The process reduces the use of alkaline reagents, which can be a major component of the operational cost in brine mineralization processes. The amount of reagent to carbonate enriched solutions can be much smaller than that to carbonate untreated brines. In addition, the use of an expensive virgin reagent (e.g., NaOH) can be omitted by substitution of alkaline wastes.

In summary, the proposed process provides a large-scale $CO_2$ sequestration route that features low energy consumption, operational stability, reduced chemical use, and scalability.

The following are example embodiments of this disclosure.

First Aspect

In some embodiments according to a first aspect, a method includes: (1) extracting divalent ions from solids by leaching to form a divalent ion-containing solution; (2) subjecting the divalent ion-containing solution to concentration to form a concentrated divalent ion-containing solution; and (3) inducing precipitation of a divalent ion hydroxide salt from the concentrated divalent ion-containing solution.

In some embodiments of the method, the solids include at least one of (a) slags or (b) fly ashes.

In some embodiments of the method, extracting the divalent ions from the solids includes exposing the solids to a leaching solution.

In some embodiments of the method, the leaching solution includes a leaching agent.

In some embodiments of the method, the leaching solution includes an acid.

In some embodiments of the method, extracting the divalent ions from the solids includes pulverizing the solids, and exposing the pulverized solids to a leaching solution.

In some embodiments of the method, subjecting the divalent ion-containing solution to concentration is performed using capacitive concentration.

In some embodiments of the method, subjecting the divalent ion-containing solution to capacitive concentration includes disposing the divalent ion-containing solution between a pair of electrodes, and applying an electrical input to the electrodes.

In some embodiments of the method, subjecting the divalent ion-containing solution to capacitive concentration includes passing the divalent ion-containing solution through a series of n connected capacitive concentration cells, wherein n is 1 or greater.

In some embodiments of the method, inducing the precipitation of the divalent ion hydroxide salt includes heating the concentrated divalent ion-containing solution to a temperature at or below about 100° C.

In some embodiments of the method, inducing the precipitation of the divalent ion hydroxide salt includes heating the concentrated divalent ion-containing solution to a temperature up to about 90° C.

In some embodiments of the method, the divalent ions include calcium ions, and inducing the precipitation of the divalent ion hydroxide salt includes inducing precipitation of portlandite.

In some embodiments of the method, the divalent ions include magnesium ions, and inducing the precipitation of the divalent ion hydroxide salt includes inducing precipitation of brucite.

Second Aspect

In some embodiments according to a second aspect, a method for portlandite production includes: (1) extracting calcium from solids by leaching to form a calcium ion-containing solution; (2) subjecting the calcium ion-containing solution to concentration to form a concentrated calcium ion-containing solution; and (3) inducing precipitation of portlandite from the concentrated calcium ion-containing solution.

Third Aspect

In some embodiments according to a third aspect, a method for brucite production includes: (1) extracting magnesium from solids by leaching to form a magnesium ion-containing solution; (2) subjecting the magnesium ion-containing solution to concentration to form a concentrated magnesium ion-containing solution; and (3) inducing precipitation of brucite from the concentrated magnesium ion-containing solution.

Fourth Aspect

In some embodiments according to a fourth aspect, a method includes: (1) producing a concentrated divalent ion-containing solution from a feed solution; and (2) introducing carbon dioxide to the concentrated divalent ion-containing solution to induce precipitation of a carbonate salt.

In some embodiments of the method, production of the concentrated divalent ion-containing solution is performed by nanofiltration or reverse osmosis. In some embodiments, production of the concentrated divalent ion-containing solution is performed using a filtration membrane with a pore size from about 0.5 nm to about 10 nm. In some embodiments, production of the concentrated divalent ion-containing solution includes production of a retentate having a greater concentration of divalent ions than the feed solution.

In some embodiments of the method, production of the concentrated divalent ion-containing solution is performed by capacitive concentration.

In some embodiments of the method, a concentration of divalent ions in the concentrated divalent ion-containing solution is about 1.2 times or greater than a concentration of the divalent ions in the feed solution, such as about 1.4 times or greater, about 1.5 times or greater, about 2 times or greater, about 2.5 times or greater, about 5 times or greater, about 10 times or greater, about 20 times or greater, about 50 times or greater, and up to about 100 times or greater.

In some embodiments of the method, a concentration of monovalent ions in the feed solution is greater than a concentration of divalent ions in the feed solution. In some embodiments, a concentration of the divalent ions in the concentrated divalent ion-containing solution is greater than a concentration of the monovalent ions in the concentrated divalent ion-containing solution, such as about 1.2 times or greater, about 1.4 times or greater, about 1.5 times or greater, about 2 times or greater, about 2.5 times or greater, about 5 times or greater, about 10 times or greater, about 50 times or greater, about 100 times or greater, about 500 times or greater, and up to about 1000 times or greater.

In some embodiments, the method further includes adjusting the pH of the concentrated divalent ion-containing solution, prior to introduction of the carbon dioxide. In some embodiments, adjusting the pH of the concentrated divalent ion-containing solution includes increasing the pH to about 7 or greater, about 7.5 or greater, about 8 or greater, about 9 or greater, about 10 or greater, or about 11 or greater. In some embodiments, adjusting the pH of the concentrated divalent ion-containing solution includes introducing an alkaline reagent to the concentrated divalent ion-containing solution. In some embodiments, the alkaline reagent includes an alkaline waste.

In some embodiments of the method, introduction of the carbon dioxide includes inducing precipitation of at least one of the following: calcium carbonate, magnesium carbonate, or other carbonates (e.g., barium carbonates) or other related solids.

Fifth Aspect

In some embodiments according to a fifth aspect, a system includes: (1) a divalent ion enrichment unit to produce a concentrated divalent ion-containing solution from a feed solution; and (2) a carbonation reactor connected to the divalent ion enrichment unit to receive the concentrated divalent ion-containing solution and introduce carbon dioxide to the concentrated divalent ion-containing solution to induce precipitation of a carbonate salt.

In some embodiments of the system, the divalent ion enrichment unit includes a membrane separation unit. In some embodiments, the membrane separation unit includes a nanofiltration membrane. In some embodiments, the membrane separation unit includes a reverse osmosis membrane.

In some embodiments of the system, the divalent ion enrichment unit includes a capacitive concentration cell. In some embodiments, the capacitive concentration cell includes multiple electrodes and an electrical source connected to the electrodes.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A method comprising:
   extracting divalent ions from solids by leaching to form a divalent ion-containing solution;
   subjecting the divalent ion-containing solution to concentration to form a concentrated divalent ion-containing solution; and
   inducing precipitation of a divalent ion hydroxide salt from the concentrated divalent ion-containing solution;
   wherein subjecting the divalent ion-containing solution to concentration comprises using reverse osmosis or nanofiltration to separate divalent ions from monovalent ions.

2. The method of claim 1, wherein subjecting the divalent ion-containing solution to concentration is performed using a nanofiltration membrane.

3. The method of claim 1, wherein subjecting the divalent ion-containing solution to concentration is performed using a reverse osmosis membrane.

4. The method of claim 1, wherein inducing precipitation of a divalent ion hydroxide salt from the concentrated divalent ion-containing solution comprises contacting the concentrated divalent ion-containing solution with carbon dioxide.

5. The method of claim 1, wherein the solids include at least one of (a) slags or (b) fly ashes.

6. The method of claim 1, wherein extracting the divalent ions from the solids includes exposing the solids to a leaching solution.

7. The method of claim 6, wherein the leaching solution includes a leaching agent.

8. The method of claim 6, wherein the leaching solution includes an acid.

9. The method of claim 1, wherein extracting the divalent ions from the solids includes pulverizing the solids, and exposing the pulverized solids to a leaching solution.

10. The method of claim 1, wherein subjecting the divalent ion-containing solution to concentration further comprises subjecting the divalent ion-containing solution to capacitive concentration.

11. The method of claim 10, wherein subjecting the divalent ion-containing solution to capacitive concentration includes disposing the divalent ion-containing solution between a pair of electrodes, and applying an electrical input to the electrodes.

12. The method of claim 10, wherein subjecting the divalent ion-containing solution to capacitive concentration includes passing the divalent ion-containing solution through a series of n connected capacitive concentration cells, wherein n is 1 or greater.

13. The method of claim 1, wherein inducing the precipitation of the divalent ion hydroxide salt includes heating the concentrated divalent ion-containing solution to a temperature at or below 100° C.

14. The method of claim 1, wherein the divalent ions include calcium ions, and inducing the precipitation of the divalent ion hydroxide salt includes inducing precipitation of portlandite.

15. The method of claim 1, wherein the divalent ions include magnesium ions, and inducing the precipitation of the divalent ion hydroxide salt includes inducing precipitation of brucite.

* * * * *